(12) United States Patent
Subramanian et al.

(10) Patent No.: US 12,073,123 B2
(45) Date of Patent: Aug. 27, 2024

(54) METADATA COMPACTION

(71) Applicant: NetApp Inc., San Jose, CA (US)

(72) Inventors: Ananthan Subramanian, San Ramon, CA (US); Kumaran Nagappan, San Jose, CA (US); Sriram Venketaraman, Bangalore (IN); Szu-Wen Kuo, Taipei (TW); Yong Eun Cho, Saratoga, CA (US)

(73) Assignee: NetApp, Inc., San Jose, CA (US)

( * ) Notice: Subject to any disclaimer, the term of this patent is extended or adjusted under 35 U.S.C. 154(b) by 25 days.

(21) Appl. No.: 17/963,077

(22) Filed: Oct. 10, 2022

(65) Prior Publication Data

US 2023/0176791 A1 Jun. 8, 2023

Related U.S. Application Data

(63) Continuation of application No. 17/083,945, filed on Oct. 29, 2020, now Pat. No. 11,467,774, which is a continuation of application No. 16/365,956, filed on Mar. 27, 2019, now Pat. No. 10,852,994.

(51) Int. Cl.
*G06F 12/00* (2006.01)
*G06F 3/06* (2006.01)

(52) U.S. Cl.
CPC .......... *G06F 3/0661* (2013.01); *G06F 3/0608* (2013.01); *G06F 3/064* (2013.01); *G06F 3/0673* (2013.01)

(58) Field of Classification Search
CPC ...... G06F 3/0661; G06F 3/0608; G06F 3/064; G06F 3/0673
See application file for complete search history.

(56) References Cited

U.S. PATENT DOCUMENTS

| | | | |
|---|---|---|---|
| 7,200,603 B1 * | 4/2007 | Hitz | G06F 11/1451 |
| 7,496,586 B1 * | 2/2009 | Bonwick | H03M 7/30 |
| 7,590,633 B1 * | 9/2009 | Manley | H04L 69/329 |
| 9,880,762 B1 * | 1/2018 | Armangau | G06F 3/067 |
| 10,852,994 B2 | 12/2020 | Subramanian et al. | |
| 11,467,774 B2 | 10/2022 | Subramanian et al. | |
| 2008/0077590 A1 * | 3/2008 | Pandit | G06F 11/1435 |
| 2017/0031940 A1 * | 2/2017 | Subramanian | G06F 16/13 |

* cited by examiner

*Primary Examiner* — Shawn X Gu
(74) *Attorney, Agent, or Firm* — Cooper Legal Group, LLC

(57) ABSTRACT

Techniques are provided for compacting indirect blocks. For example, an object is represented as a structure comprising data blocks within which data of the object is stored and indirect blocks comprising block numbers of where the data blocks are located in storage. Block numbers within a set of indirect blocks are compacted into a compacted indirect block comprising a base block number, a count of additional block numbers after the base block number in the compacted indirect block, and a pattern of the block numbers in the compacted indirect block. The compacted indirect block is stored into memory for processing access operations to the object. Storing compacted indirect blocks into memory allows for more block numbers to be stored within memory. In this way, the block numbers are read from memory is faster than loading the block numbers from disk.

20 Claims, 7 Drawing Sheets

METADATA COMPACTION

RELATED APPLICATION

This application claims priority to and is a continuation of U.S. patent application Ser. No. 17/083,945, titled "METADATA COMPACTION" and filed on Oct. 29, 2020, which claims priority to and is a continuation of U.S. Pat. No. 10,852,994, titled "METADATA COMPACTION" and filed on Mar. 27, 2019, which are incorporated herein by reference.

BACKGROUND

A volume is a storage area within a file system. The file system may allow users to create and store objects within the volume, such as files, directories, or other storage objects. The file system may store data of objects into data blocks of storage devices. That is, the file system divides the storage capacity of storage devices into data blocks having a particular size, such as 4096 bytes or any other size. The physical location of each data block within a storage device is addressable by a block number, such as a physical block number or virtual block number.

An object may be represented as a structure by the file system. For example, a file may be represented by a hierarchical tree structure. The hierarchical tree structure comprises leaf nodes that are the data blocks within which user data is stored. The hierarchical tree structure comprises one or more levels of intermediate nodes that are indirect blocks comprising block numbers (pointers) used to address/locate blocks of a lower level of the hierarchical tree structure. For example, the leaf nodes are at a level (0). Intermediate nodes at a level (1) comprise block numbers pointing to data blocks of the leaf nodes. Intermediate nodes at a level (2) comprise block numbers pointing to the intermediate nodes at the level (1). In this way, the hierarchical tree structure may be traversed to locate and access user data at particular physical locations within storage based upon block numbers within intermediate nodes.

DETAILED DESCRIPTION

Figure 1:
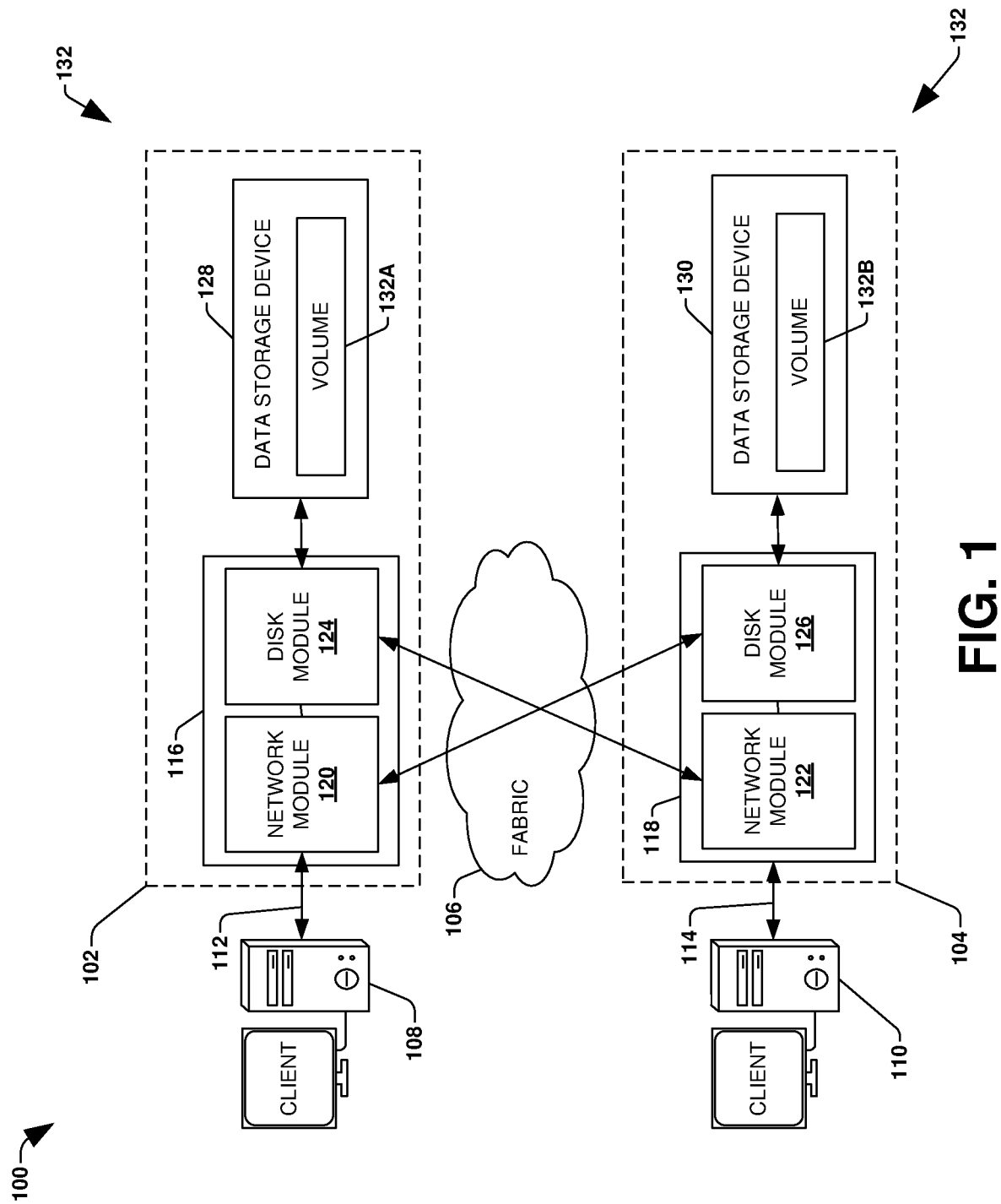
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A computing device, such as a storage controller, a computing node of a cluster, a computer, a storage virtual machine, a storage service, etc., may implement a file system that allows users to store data within a volume. The file system may represent an object, such as a file, of the volume using a structure comprising data blocks within which data of the object are stored and indirect blocks comprising block numbers of where the data blocks or other indirect blocks are located in storage. When data of the object is requested by an access operation (e.g., a read or write operation), the structure is use to identify the location of corresponding data blocks within storage.

The file system may store the data blocks and indirect blocks within storage and/or memory of the computing device. The blocks may be stored according to a block size used by the file system, such as 4096 bytes or any other size. Storing blocks within memory, such as by caching user data, allows the computing device to process access operations targeting the blocks faster than if the data is read from storage (e.g., a hard disk device, cloud storage, a solid state storage device, or other storage device may have higher latency than the memory). The size of memory may be limited compared to the size of a storage device, and thus only so much data can be stored within memory. Because the indirect blocks are used to identify the data blocks for processing access operations, it would be advantageous to store as many indirect blocks containing block numbers as possible within memory to improve the latency of processing access operations since reading indirect blocks from memory is faster than loading the indirect blocks from storage. For example, the ability to store more indirect blocks containing block numbers within memory will improve the processing time of random access operations that are larger than the block size used by the file system because less load operations of indirect blocks from storage are performed.

Accordingly, as provided herein, indirect blocks are compacted to reduce the size of the indirect blocks so that multiple indirect blocks can be packed into a single compacted indirect block having the same size as an indirect block. That is, the size of an indirect block may be 4096 bytes or any other block size used by a file system. Block numbers may be 6 bytes or some other size, and thus only so many block numbers can be stored within an indirect block. The present system using an encoding scheme that compact the indirect block so that the same number of block numbers can be represented using less storage space. In this way, multiple indirect blocks can be stored into a single compacted indirect block representing all of the block numbers of those indirect blocks using the same 4096 bytes. As will be subsequently described in further detail, block numbers are compacted (encoding) using the encoding scheme based upon various patterns of block numbers, such as sequential block numbers, repeating block numbers, or offsets between block numbers. It may be appreciated that other compression techniques beyond compaction/encoding are contemplated, and that any type of data and/or metadata may be compressed, compacted, encoded, etc. so that more data and/or metadata may be stored (e.g., cached) in memory as opposed to having to be read from disk.

Compacting indirect blocks so that more block numbers can be represented using the same amount of storage space allows for more indirect blocks and thus block numbers to be stored within memory. Because more indirect blocks containing block numbers are stored within memory, the latency of processing access operations is improved. This is because there is a higher likelihood that block numbers used to locate request data blocks targeted by access operations will be in memory instead of storage where a disk read operation would have to be performed. In this way, more indirect blocks can be stored within memory. Because more indirect blocks can be represented using less storage space, there is storage savings for storing indirect blocks as compacted indirect blocks. Also, when processing random access operations (e.g., a read operation to non-sequential block numbers), there may be less load operations of indirect blocks from storage due to more indirect blocks being stored within memory. For example, one disk read can be saved. Compacting indirect blocks also provides for path length reduction in a storage layer due to less indirect blocks being flushed from memory to storage. Further, because a block number can be selectively read from a compacted indirect block without having to uncompact the entire compacted indirect block, processor resources otherwise wasted in uncompacting the entire compacted indirect block are conserved.

It may be appreciated that a variety of different data and/or metadata can be compacted. For example, metadata (e.g., a size of a volume, a modification date of a file, a creation time of a file, a name of an aggregate, and/or a variety of other information relating to volumes, aggregates, files, a state of a replication relationship, and/or other data relating to the operation of storage services and a storage operating system) may be compacted to create compacted metadata. The compacted metadata may be stored within memory for efficient access.

To provide for indirect block compaction, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, computing nodes 116 and 118, for example). It will be appreciated that while two data storage systems 102 and 104 and two computing nodes 116 and 118 are illustrated in FIG. 1, that any suitable number of such components is contemplated. In an example, computing nodes 116, 118 comprise storage controllers (e.g., computing node 116 may comprise a primary or local storage controller and computing node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in an embodiment a clustered network can be distributed over a plurality of storage systems and/or computing nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The computing nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a computing node in the clustered network environment 100 can be a device attached to the network as a connection point, redistribution point or communication endpoint, for example. A computing node may be capable of sending, receiving, and/or forwarding information over a network communications channel, and could comprise any device that meets any or all of these criteria. One example of a computing node may be a data storage and management server attached to a network, where the server can comprise a general purpose computer or a computing device particularly configured to operate as a server in a data storage and management system.

In an example, a first cluster of computing nodes such as the computing nodes 116, 118 (e.g., a first set of storage controllers configured to provide access to a first storage aggregate comprising a first logical grouping of one or more storage devices) may be located on a first storage site. A second cluster of computing nodes, not illustrated, may be located at a second storage site (e.g., a second set of storage controllers configured to provide access to a second storage aggregate comprising a second logical grouping of one or more storage devices). The first cluster of computing nodes and the second cluster of computing nodes may be configured according to a disaster recovery configuration where a surviving cluster of computing nodes provides switchover access to storage devices of a disaster cluster of computing nodes in the event a disaster occurs at a disaster storage site comprising the disaster cluster of computing nodes (e.g., the first cluster of computing nodes provides client devices with switchover data access to storage devices of the second storage aggregate in the event a disaster occurs at the second storage site).

As illustrated in the clustered network environment 100, computing nodes 116, 118 can comprise various functional components that coordinate to provide distributed storage architecture for the cluster. For example, the computing nodes can comprise network modules 120, 122 and disk modules 124, 126. Network modules 120, 122 can be configured to allow the computing nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of computing node 116 can access a second data storage device by sending a request through the disk module 126 of computing node 118.

Disk modules 124, 126 can be configured to connect one or more data storage devices 128, 130, such as disks or arrays of disks, flash memory, or some other form of data storage, to the computing nodes 116, 118. The computing nodes 116, 118 can be interconnected by the cluster fabric 106, for example, allowing respective computing nodes in the cluster to access data on data storage devices 128, 130 connected to different computing nodes in the cluster. Often, disk modules 124, 126 communicate with the data storage devices 128, 130 according to the SAN protocol, such as SCSI or FCP, for example. Thus, as seen from an operating system on computing nodes 116, 118, the data storage devices 128, 130 can appear as locally attached to the operating system. In this manner, different computing nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different computing nodes can have a different number of network and disk modules, and the same computing node can have a different number of network modules than disk modules.

Further, a host device 108, 110 can be networked with the computing nodes 116, 118 in the cluster, over the storage networking connections 112, 114. As an example, respective host devices 108, 110 that are networked to a cluster may request services (e.g., exchanging of information in the form of data packets) of computing nodes 116, 118 in the cluster, and the computing nodes 116, 118 can return results of the requested services to the host devices 108, 110. In an embodiment, the host devices 108, 110 can exchange information with the network modules 120, 122 residing in the computing nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the computing node 116 within data storage system 102. The computing node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the computing node 118 within the data storage system 104 (e.g., which may be remote from the data storage system 102). The computing node 118 can forward the data to the data storage device 130 using the disk module 126, thereby accessing volume 132B associated with the data storage device 130.

It may be appreciated that indirect block compaction may be implemented within the clustered network environment 100. It may be appreciated that indirect block compaction may be implemented for and/or between any type of computing environment, and may be transferrable between physical devices (e.g., computing node 116, computing node 118, a desktop computer, a tablet, a laptop, a wearable device, a mobile device, a storage device, a server, etc.) and/or a cloud computing environment (e.g., remote to the clustered network environment 100).

Figure 2:
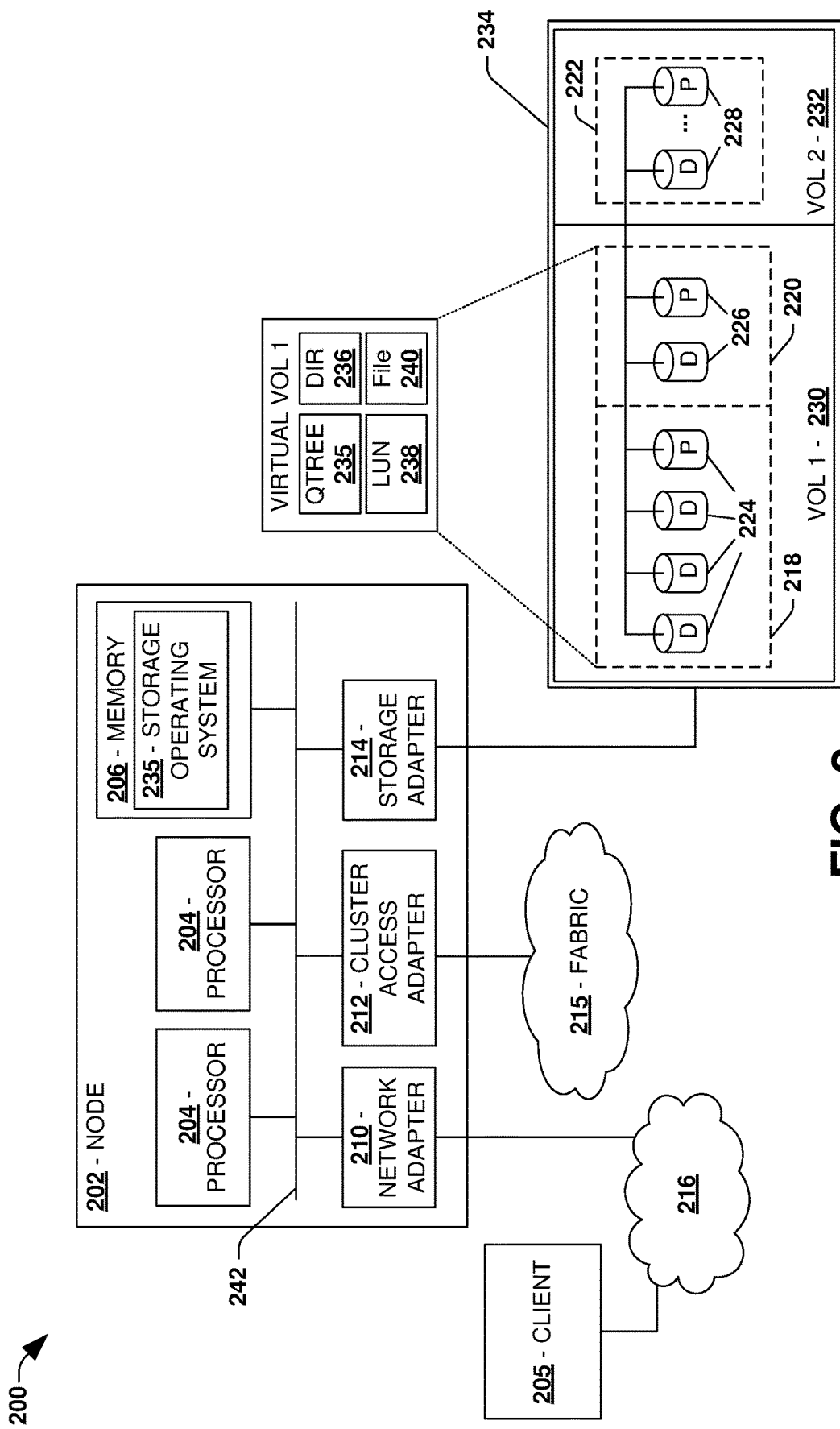
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a computing node 202 (e.g., computing nodes 116, 118 in FIG. 1), and a data storage device 234 (e.g., data storage devices 128, 130 in FIG. 1). The computing node 202 may be a general purpose computer, for example, or some other computing device particularly configured to operate as a storage server. A host device 205 (e.g., 108, 110 in FIG. 1) can be connected to the computing node 202 over a network 216, for example, to provide access to files and/or other data stored on the data storage device 234. In an example, the computing node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The computing node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the computing node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the computing node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the computing node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another computing node in the cluster) where the information is formatted into a data packet and returned to the host device 205 over the network 216 (and/or returned to another computing node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the computing node 202 connects to a volume 230, 232 through the storage adapter 214, a connection between the computing node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that indirect block compaction may be implemented for the data storage system 200. It may be appreciated that indirect block compaction may be implemented for and/or between any type of computing environment, and may be transferrable between physical devices (e.g., computing node 202, host device 205, a desktop computer, a tablet, a laptop, a wearable device, a mobile device, a storage device, a server, etc.) and/or a cloud computing environment (e.g., remote to the computing node 202 and/or the host device 205).

Figure 3:
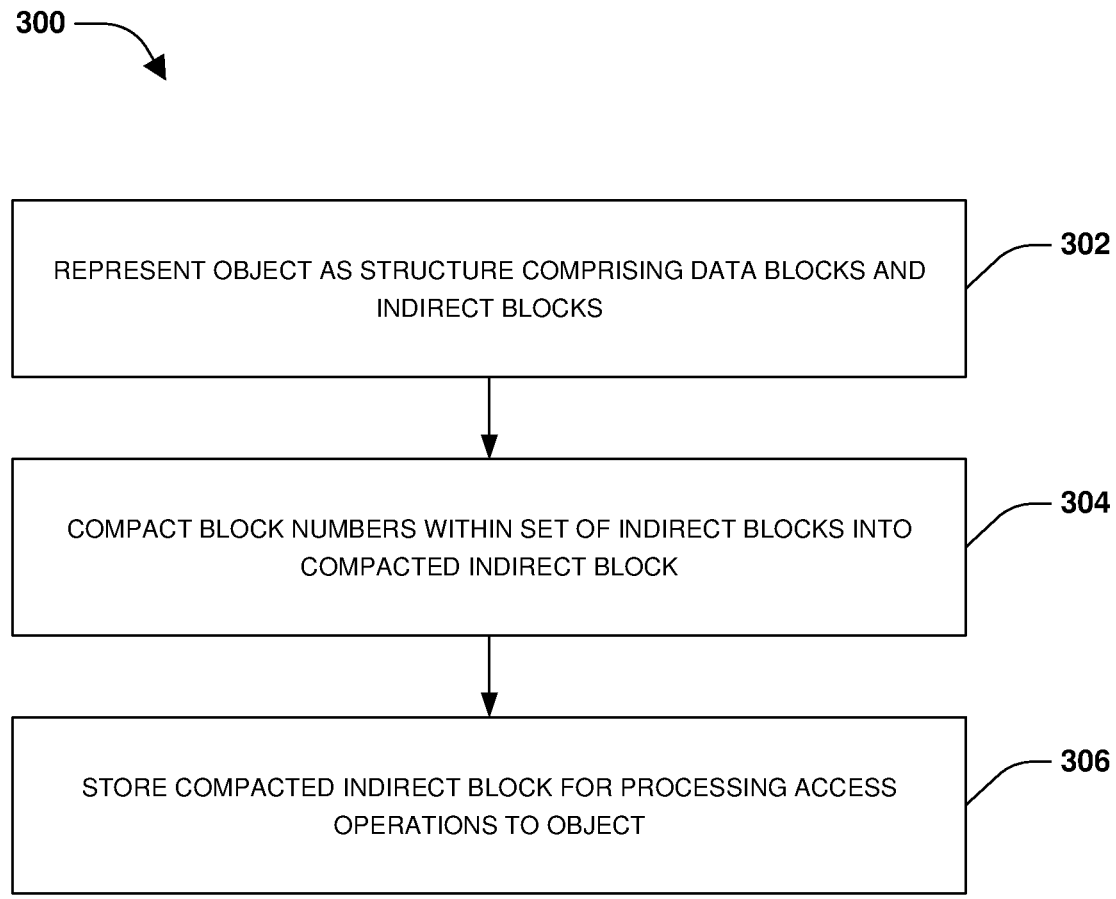
FIG. 3 is a flow chart illustrating an example method for indirect block compaction.
Figure 4A:
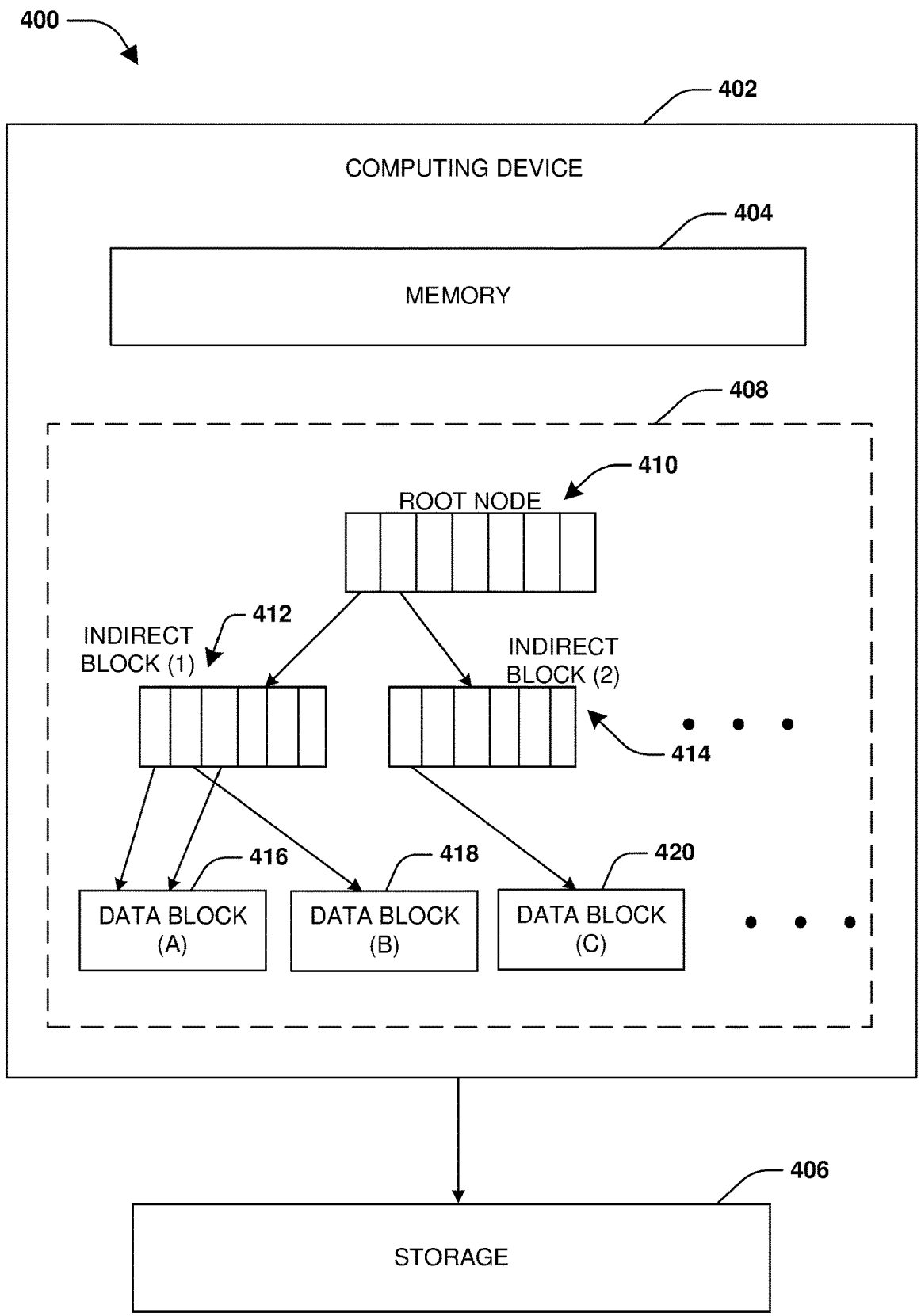
FIG. 4A is a component block diagram illustrating an example system for indirect block compaction.
Figure 4B:
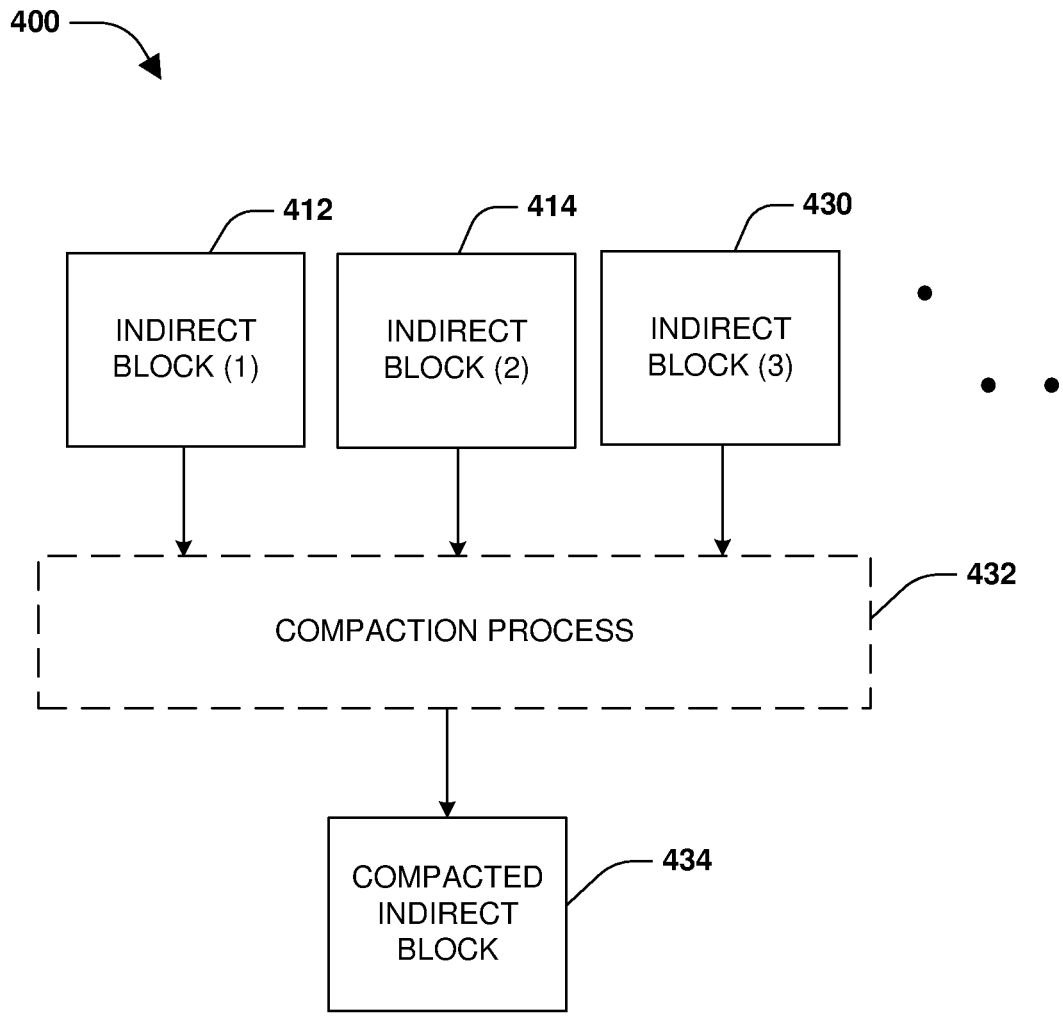
FIG. 4B is a component block diagram illustrating an example system for indirect block compaction, where indirect blocks are compacted and packed into a compacted indirect block.

One embodiment of indirect block compaction is illustrated by an exemplary method 300 of FIG. 3 and further described in conjunction with system 400 of FIGS. 4A-4B. A computing device 402 (e.g., a computing node, a storage controller, a computer, a storage virtual machine, software or hardware or combination thereof, etc.) may comprise and/or utilize memory 404 and/or other computing resources. The computing device 402 may have access to storage 406, such as a hard disk drive, a solid state storage device, attached storage, network attached storage, cloud storage, etc. The memory 404 may provide the computing device 402 with faster read and write times than the storage 406, but the amount of storage space in memory 404 may be limited compared to the storage 406. Thus, the computing device 402 may cache certain data within memory 404 for faster access in order to process access operations, such as read and write operations, faster than if data has to be loaded from the storage 406.

At 302, a file system of the computing device 402 may represent an object, such as a file, as a structure 408 such as a hierarchical tree structure of nodes representing user data in leaf nodes (e.g., data blocks of user data) and intermediates nodes of indirect blocks comprising block numbers (e.g., pointers or addresses) of other nodes (e.g., a level (2) intermediate node may comprise block numbers of one or more level (1) intermediate nodes, a level (1) intermediate node may comprise block numbers of one or more level (0) leaf nodes, etc.). The structure 408 may comprise any number of levels of nodes.

In an example, the structure 408 comprise a root node 410, such as an inode of the file. The structure 408 may comprise a level (1) of intermediate nodes, such as a first indirect block 412, a second indirect block 414, and/or other indirect blocks not illustrated. The structure 408 may comprise a level (0) of leaf nodes, such as a data block (A) 416 of user data of the object, a data block (B) 418 of user data of the object, a data block (C) 420 of user data of the object, etc. Each indirect block and data block may have a block size used by the file system to store data, such as 4096 bytes. Each indirect block and data block may be assigned a block number used to locate/address each indirect block and data block. The data blocks comprise user data, and the indirect blocks comprise block numbers of other blocks. For example, the first indirect block 412 comprises block numbers of the data block (A) 416, the data block (B) 418, and/or other data blocks not illustrated. The second indirect block 414 comprises block numbers of the data block (C) 420 and/or other data blocks not illustrated. The root node 410 may comprise block numbers of the first indirect block 412, the second indirect block 414, and/or other indirect blocks. It may be appreciated that the structure 408 illustrated in FIG. 4A is merely a simplistic example of a structure, and that structures may comprise more nodes, levels of nodes, and/or types of nodes and data.

When an access operation is received to access user data within the data blocks (leaf nodes), the structure 408 is traversed to locate such data blocks. For example, the root node 410 may be traversed to identify the first indirect block 412 as comprising a block number for the data block (B) 418 that is to be read by a read operation. Thus, the first indirect block 412 is traversed to obtain the block number that is then used to access the data block (B) 418 since the block number corresponds to a location/address of the data block (B) 418 (e.g., a physical location of the data block (B) 418 within the storage 406).

Because the structure 408 is traversed and used for locating data targeted by access operations, it is advantageous to store as many indirect blocks of the structure 408 in the lower latency memory 404 as possible because accessing indirect blocks from the memory 404 is much faster than having to load the indirect blocks from storage 406, thus improving latency. However, the amount of data that can be stored within the memory 404 may be significantly less than the amount of data that can be stored in the storage 406. Accordingly, as provided herein, indirect blocks are compacted to reduce their size so that multiple indirect blocks can be packed into a single compacted indirect block that is the same size of a single indirect block, but is capable of representing more block numbers than a single indirect block. Because multiple indirect blocks are packed into a single compacted indirect block, the compacted indirect block will now store more block numbers than a single indirect block. In this way, more block numbers can be stored within memory 404 using the same memory footprint because each compacted indirect block has the same size as a single indirect block, but also has more block numbers than the single indirect block because multiple indirect blocks are packed into the compacted indirect block.

At 304, one or more indirect blocks, such as the first indirect block 412, the second indirect block 414, a third indirect block 430, and/or other indirect blocks are compacted 432 and packed into a compacted indirect block 434, as illustrated by FIG. 4B. In an example of compacting 432 the first indirect block 412, block numbers within the first indirect block 412 are compacted (encoded) using the encoding scheme that is based upon patterns of the block numbers, such as whether block numbers are sequential (e.g., a sequential pattern of block numbers 50, 51, 52, and 53), repeating (e.g., a repeating pattern of block numbers 60, 60, and 60), or offsets from a base block number (e.g., a base block number of 50 along with other block numbers 55 and 70 that are offset from the base block number of 50 by 5 and 20 respectively). For a set of block numbers encoded within the compacted indirect block 434, there is a base block number, a count of subsequent block numbers after the base block number, and a pattern of the set of block numbers. It may be appreciated that other compression techniques beyond compaction/encoding are contemplated, and that encoding based upon length, offset, and pattern is merely one embodiment of how any type of data and/or metadata may be compressed/compacted. Also, any type of data and/or metadata may be compressed, compacted, encoded, etc. so that more data and/or metadata may be stored (e.g., cached) in memory as opposed to having to be read from disk.

In an example, the first indirect block 412 comprises block numbers 357, 358, 359, 360, 112, 112, 112, 370, 236, 375, and/or other block numbers. Because the first 4 block numbers are sequential, those block numbers are encoded as a base block number of 357, a count of 3 additional sequential block numbers after the base block number of 357, and a pattern of 1 corresponding to a sequential pattern. Thus, instead of storing 4 block numbers 357, 358, 359, and 360 that are 6 bytes each, merely a tuple is stored of (357, 3, 1). Because the next 3 block numbers are repeating, those block numbers are encoded as a base block number of 112, a count of 2 additional repeating block numbers after the base block number of 112, and a pattern of 2 corresponding to a repeat pattern. Thus, instead of storing 3 block numbers 112, 112, and 112 that are 6 bytes each, merely a tuple is stored of (112, 2, 2). Because the last 3 block numbers may be close enough to a base block number, those block numbers are encoded as a base block number of 370, a count of 2 additional block numbers after the base block number of 370, a pattern of 3 corresponding to an offset pattern, and offsets −134 and 5 of the additional block numbers being offset from the base block number of 370. Thus, instead of storing 3 block numbers 370, 236, and 375 that are 6 bytes each, merely (370, 2, 3, −134, 5) is stored. Storing (370, 2, 3, −134, 5) saves storage space compared to storing the 3 block numbers because the length, offset, and pattern can be stored using just a few bits, which is less than the amount of bits otherwise used to store the 3 block numbers.

In this way, the size of the indirect blocks is significantly reduced by compaction 432 and encoding of block numbers. This allows for multiple indirect blocks and the encoded block numbers to be packed into the single compacted indirect block 434 that can now represent more block numbers than a single indirect block using the same block size of information such as 4096 bytes.

Other information may be represented within the compacted indirect block 434. For example, data blocks may be compressed into compression groups. In an example, a compression group corresponds to a relatively small group of consecutive blocks that are compressed together. For example, a file is divided into chunks of data referred to as compression groups. Each compression group may have a size limit, such as 32 kb or any other size. Each compression group comprises data from only a single file. Compression may be limited to files having a certain minimum size such as 8 bk or larger. Using a compression group can improve I/O, such as where a read operation for compressed data only reads the compression groups that contain the requested data instead of an entire file. If a block number within the compacted indirect block 434 corresponds to a data block within a compression group, then a compression group indicator is added into the compacted indirect block 434 for the block number.

Block numbers of the indirect blocks being compacted 432 are encoded into compaction groups. The number of blocks that can be encoded into a compaction group may be limited to a threshold amount, such as 32 block numbers. Offsets of each compaction group within the compacted indirect block 434 are stored within a header of the compacted indirect block 434. In an example, a lookup table is created for the compacted indirect block 434. The lookup table is used to identify offsets of compaction groups within the compacted indirect block 434 of the object.

In this way, multiple indirect blocks are compacted to smaller sizes by encoding block numbers to create a compacted indirect block 434 representing more block numbers than a single indirect block but by using the same storage space (block size) as an uncompacted indirect block. Further, more block numbers can be stored within the memory 404 of the computer device 402. For example, the memory 404 may have space to store ten 4096 byte indirect blocks that each comprise 50 block numbers. Normally, only 500 block numbers would be represented by the 10 indirect blocks stored into the memory 404. However, since compacted indirect blocks may be capable of representing 200 block numbers using the same 4096 bytes, 2,000 block numbers would be represented by 10 compacted indirect blocks stored in the memory 404. It may be appreciated that these numbers are merely used for illustrative purposes and simplicity. Accordingly, the compacted indirect block 434 and/or other compacted indirect blocks can be loaded into the memory 404, at 306, so that the compacted indirect blocks can be accessed more quickly and with lower latency for processing access operations (read and write operations) than if indirect blocks had to be loaded from the storage 406.

In an example, a read request (read operation) for the data block (B) 418 of the object is received by the computing device 402. A header of the compacted indirect block 434 is evaluated to identify an offset of a compaction group, within the compacted indirect block 434, comprising a block number of the data block (B) 418. The block number is uncompacted from the compacted indirect block 434 to obtain the block number of the data block (B) 418. To conserve processor resource utilization, other compression groups are not uncompacted and thus the entire 4096 bytes of the compacted indirect block 434 does not need to be uncompacted. The block number is used to read the data block (B) 418 in order to process the read request.

In an example, a write operation to write data to the object is received by the computing device 402. The write request may be executed to create dirty data (new data written by the write operation) marked to be stored to the storage 406 during a consistency point. During the consistency point, the dirty data is stored into the storage 406. Block numbers may be assigned to data blocks into which the dirty data is stored. The compacted indirect block 434 may be uncompacted in order to identify all of the block numbers represented by the compacted indirect block 434. These block numbers along with the block numbers of the dirty data are then recompacted to create one or more compacted indirect blocks. In an example of performing the consistency point, block numbers are assigned to data blocks. The block numbers of the data blocks are then stored into level (1) indirect blocks. Block numbers are then assigned to the level (1) indirect blocks. Any number of indirect block levels may be created and assigned block numbers. Indirect blocks are then recompacted and packed into compacted indirect blocks. In an example, recompaction occurs after block numbers of the data blocks are stored into the level (1) indirect blocks. In another example, recompaction occurs in parallel with the storing of the block numbers into the level (1) indirect blocks.

It may be appreciated that a variety of different data and/or metadata can be compacted. For example, metadata (e.g., a size of a volume, a modification date of a file, a creation time of a file, a name of an aggregate, and/or a variety of other information relating to volumes, aggregates, files, a state of a replication relationship, and/or other data relating to the operation of storage services and a storage operating system) may be compacted to create compacted metadata. The compacted metadata may be stored within memory for efficient access.

Figure 5:
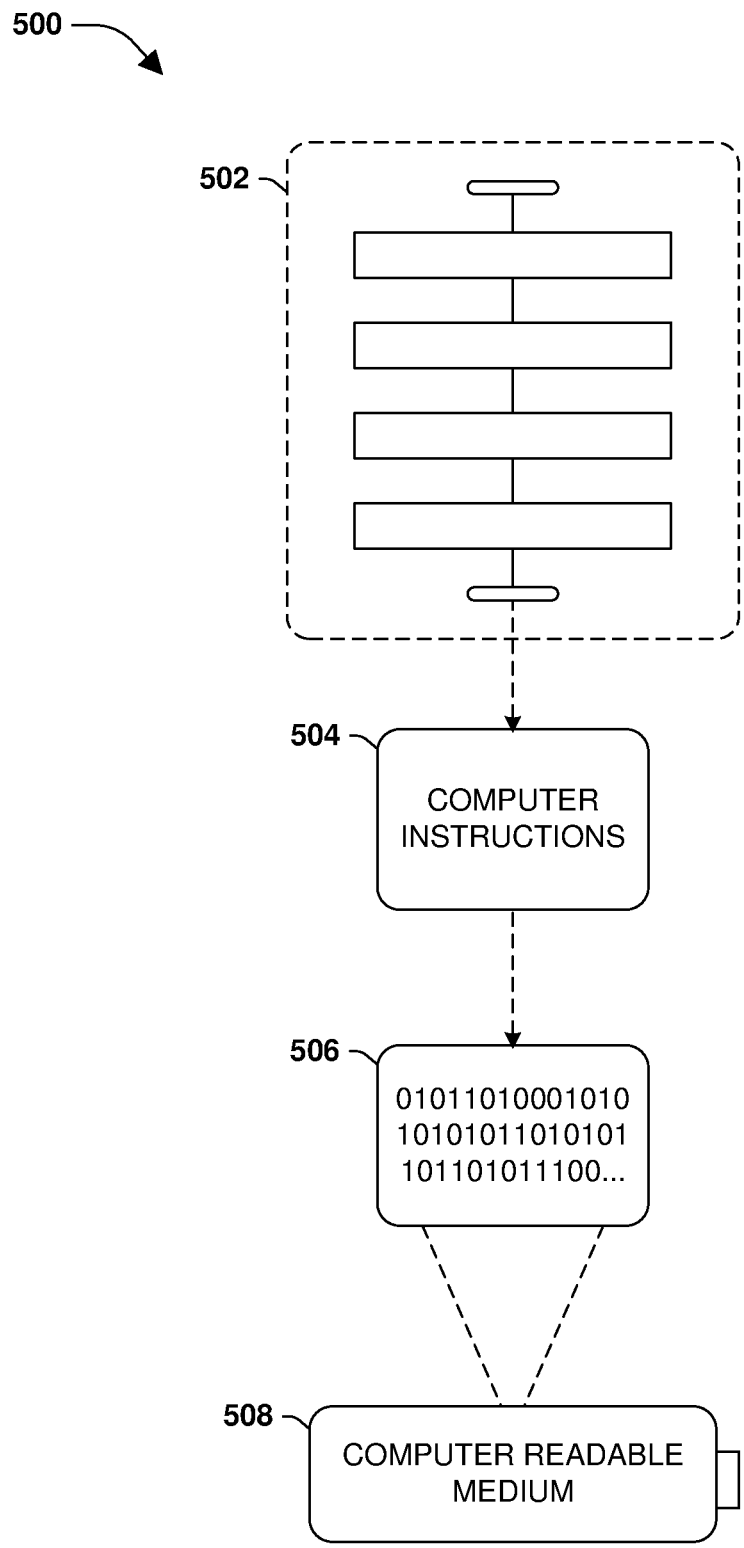
FIG. 5 is an example of a computer readable medium in which an embodiment of the invention may be implemented.

Still another embodiment involves a computer-readable medium 500 comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4B, for example. Many such computer-readable media are contemplated to operate in accordance with the techniques presented herein.

Figure 6:
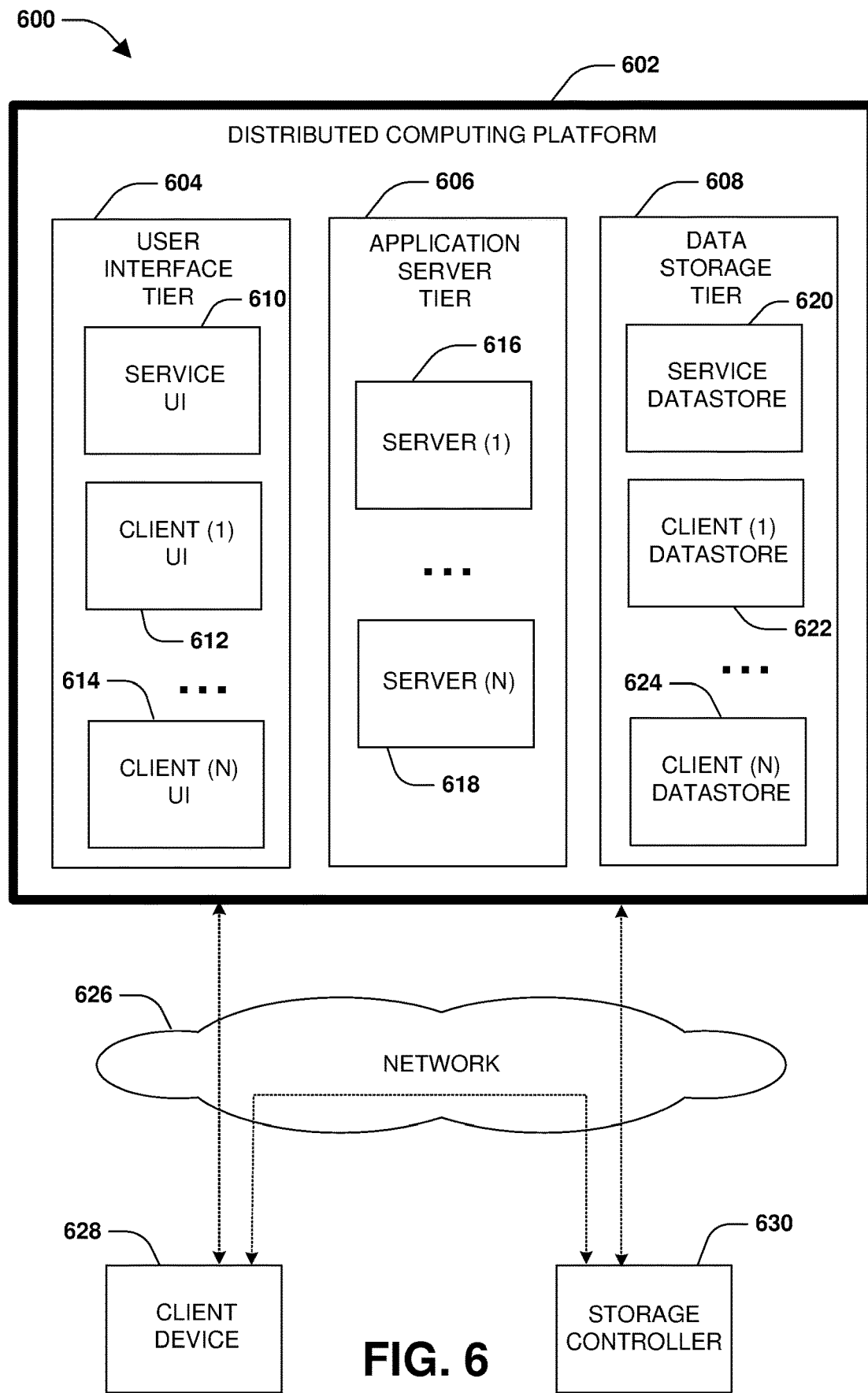
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
caching data of write operations into memory;
marking the data as dirty data to be stored from the memory to storage during a consistency point; and
implementing the consistency point by:
storing the dirty data into data blocks of the storage;
assigning block numbers to the data blocks into which the dirty data is stored;
storing the block numbers into indirect blocks; and
utilizing an encoding scheme to compact the indirect blocks into a compacted indirect block based upon patterns of the block numbers stored within the indirect blocks.

2. The method of claim 1, wherein the indirect blocks comprise level (1) indirect blocks corresponding to intermediate nodes of a hierarchical tree structure, and wherein implementing the consistency point comprises:
storing the block numbers of the data blocks into the level (1) indirect blocks, wherein the encoding scheme is utilized to compact the level (1) indirect blocks in parallel with storing the block numbers of the data blocks into the level (1) indirect blocks.

3. The method of claim 1, wherein the indirect blocks comprise level (1) indirect blocks corresponding to intermediate nodes of a hierarchical tree structure, and wherein implementing the consistency point comprises:
storing the block numbers of the data blocks into the level (1) indirect blocks, wherein the encoding scheme is utilized to compact the level (1) indirect blocks subsequent the block numbers of the data blocks being stored into the level (1) indirect blocks.

4. The method of claim 1, wherein the utilizing the encoding scheme comprises:
compacting the indirect blocks based upon a sequential pattern of blocks numbers.

5. The method of claim 1, wherein the utilizing the encoding scheme comprises:
in response to identifying a repeating pattern of block numbers assigned to the data blocks, compacting the indirect blocks based upon the repeating pattern of blocks numbers.

6. The method of claim 1, wherein the utilizing the encoding scheme comprises:
identifying a base block number of the block numbers assigned to the data blocks;
identifying offsets from the base block number of the blocks numbers assigned to the data blocks; and
compacting the indirect blocks based upon the base block number and the offsets.

7. The method of claim 1, wherein the utilizing the encoding scheme comprises:
for a set of block numbers encoded within the compacted indirect block, storing a base block number, a count of subsequent block numbers after the base block number, and a pattern of the set of block numbers.

8. The method of claim 1, wherein the utilizing the encoding scheme comprises:
storing a tuple within the compacted indirect block to represent a set of block numbers assigned to one or more of the data blocks.

9. The method of claim 1, wherein the utilizing the encoding scheme comprises:
creating a first tuple populated with a first base block number of a first set block numbers, a first count of additional sequential block numbers after the first base block number, and a sequential pattern identifier;
creating a second tuple populated with a second base block number of a second set block numbers, a second count of additional sequential block numbers after the second base block number, and a repeating pattern identifier; and
storing the first tuple and the second tuple within the compacted indirect block.

10. The method of claim 1, wherein the utilizing the encoding scheme comprises:
creating a first tuple populated with a first base block number of a first set block numbers, a first count of additional sequential block numbers after the first base block number, and a sequential pattern identifier;
creating a second tuple populated with a second base block number of a second set block numbers, a second count of additional sequential block numbers after the second base block number, an offset pattern identifier, and offsets of the additional sequential block numbers from the second base block number; and
storing the first tuple and the second tuple within the compacted indirect block.

11. The method of claim 1, wherein the utilizing the encoding scheme comprises:
creating a first tuple populated with a first base block number of a first set block numbers, a first count of additional sequential block numbers after the first base block number, and a repeating pattern identifier; and
creating a second tuple populated with a second base block number of a second set block numbers, a second count of additional sequential block numbers after the second base block number, an offset pattern identifier, and offsets of the additional sequential block numbers from the second base block number; and
storing the first tuple and the second tuple within the compacted indirect block.

12. The method of claim 1, wherein the utilizing the encoding scheme comprises:
creating a first tuple populated with a first base block number of a first set block numbers, a first count of additional sequential block numbers after the first base block number, and a repeating pattern identifier;
creating a second tuple populated with a second base block number of a second set block numbers, a second count of additional sequential block numbers after the second base block number, an offset pattern identifier, and offsets of the additional sequential block numbers from the second base block number;
creating a third tuple populated with a third base block number of a third set block numbers, a third count of additional sequential block numbers after the third base block number, and a sequential pattern identifier; and
storing the first tuple, the second tuple, and the third tuple within the compacted indirect block.

13. A system, comprising:
storage within which data blocks of data are persisted;
memory within which indirect blocks used to locate the data blocks are stored;
a means for receiving a request to access a data block within an object;
a means for uncompacting a compacted indirect block to identify an indirect block associated with the data block;
a means for utilizing a block number within the indirect block to read the data block from the storage;
a means for creating a first tuple populated with a first base block number of a first set block numbers, a first count of additional sequential block numbers after the first base block number, and a sequential pattern identifier; and
a means for storing the first tuple and a second tuple, associated with a second set of blocks numbers, within the compacted indirect block.

14. The system of claim 13, wherein the means for receiving the request is a processor.

15. The system of claim 13, wherein the means for uncompacting the compacted indirect block is a compaction process executed by a processor.

16. The system of claim 13, wherein the storage is a data storage device, and wherein the means for utilizing the block number within the indirect block to read the data block from the storage is a disk module.

17. The system of claim 13, comprising:
a means for creating the second tuple populated with a second base block number of the second set block numbers, a second count of additional sequential block numbers after the second base block number, and a repeating pattern identifier.

18. The system of claim 13, comprising:
a means for creating the second tuple populated with a second base block number of the second set block numbers, a second count of additional sequential block numbers after the second base block number, an offset pattern identifier, and offsets of the additional sequential block numbers from the second base block number.

19. The system of claim 13, comprising:
a means for creating the second tuple populated with a second base block number of the second set block numbers, a second count of additional sequential block numbers after the second base block number, an offset pattern identifier, and offsets of the additional sequential block numbers from the second base block number.

20. A non-transitory machine readable medium comprising instructions for performing a method, which when executed by a machine, causes the machine to:
cache data of write operations into memory;
mark the data as dirty data to be stored from the memory to storage during a consistency point; and
implement the consistency point by:
storing the dirty data into data blocks of the storage;
assigning block numbers to the data blocks into which the dirty data is stored;
storing the block numbers into indirect blocks; and
utilizing an encoding scheme to compact the indirect blocks into a compacted indirect block based upon patterns of the block numbers stored within the indirect blocks.

* * * * *